United States Patent
Kawasaki et al.

(10) Patent No.: US 9,934,441 B2
(45) Date of Patent: Apr. 3, 2018

(54) APPARATUS FOR RECOGNIZING LANE PARTITION LINES

(71) Applicant: DENSO CORPORATION, Kariya, Aichi-pref. (JP)

(72) Inventors: Naoki Kawasaki, Kariya (JP); Tomohiko Tsuruta, Aichi-ken (JP); Shunsuke Suzuki, Aichi-ken (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 162 days.

(21) Appl. No.: 14/886,941

(22) Filed: Oct. 19, 2015

(65) Prior Publication Data
US 2016/0110617 A1      Apr. 21, 2016

(30) Foreign Application Priority Data
Oct. 20, 2014  (JP) .................... 2014-213325

(51) Int. Cl.
| | | |
|---|---|---|
| H04N 19/167 | (2014.01) | |
| G06K 9/00 | (2006.01) | |
| H04N 7/18 | (2006.01) | |
| B60R 1/00 | (2006.01) | |

(52) U.S. Cl.
CPC ............ *G06K 9/00798* (2013.01); *B60R 1/00* (2013.01); *H04N 7/183* (2013.01); *B60R 2300/804* (2013.01)

(58) Field of Classification Search
CPC ....... G06K 9/00798; B60R 1/00; H04N 7/183
See application file for complete search history.

(56) References Cited

U.S. PATENT DOCUMENTS

| | | | |
|---|---|---|---|
| 5,712,618 A * | 1/1998 | McKenna | B60Q 1/38 340/463 |
| 5,904,725 A * | 5/1999 | Iisaka | G01S 5/16 348/116 |
| 6,473,678 B1 * | 10/2002 | Satoh | B62D 15/025 180/168 |
| 2002/0042668 A1 * | 4/2002 | Shirato | G06K 9/00798 701/1 |

(Continued)

FOREIGN PATENT DOCUMENTS

| | | |
|---|---|---|
| JP | H09-035065 A | 2/1997 |
| JP | H11-053551 A | 2/1999 |
| JP | 2005-018148 A | 1/2005 |

*Primary Examiner* — Christopher Findley
(74) *Attorney, Agent, or Firm* — Knobbe, Martens, Olson & Bear, LLP (57) ABSTRACT

An apparatus for recognizing lane partition lines on opposite sides of a traveling lane of a vehicle based on a forward image captured by a camera mounted in the vehicle. In the apparatus, an allowable range limiter is configured to, based on a learned value of a lane width learned by a lane width learner, limit allowable ranges for the respective lane partition lines, where in the allowable ranges the respective lane partition lines are allowed to be detected in the forward image. A lane change determiner is configured to determine whether or not there is a lane change made by the vehicle. The allowable range limiter is further configured to, if it is determined by the lane change determiner that there is a lane change, enlarge at least one of the allowable ranges limited by the allowable range limiter based on the learned value of the lane width.

14 Claims, 4 Drawing Sheets

(56) References Cited

U.S. PATENT DOCUMENTS

| | | | | |
|---|---|---|---|---|
| 2005/0200467 A1* | 9/2005 | Au | .......................... | B60Q 1/34 340/465 |
| 2013/0151145 A1* | 6/2013 | Ishikawa | ............ | G01C 21/3667 701/428 |
| 2013/0231830 A1* | 9/2013 | Van Dan Elzen | .... | B60W 50/14 701/42 |
| 2014/0147007 A1* | 5/2014 | Hayakawa | ............. | G08G 1/167 382/103 |
| 2014/0169630 A1* | 6/2014 | Fukata | .................. | G08G 1/167 382/103 |
| 2014/0236473 A1* | 8/2014 | Kondo | ............... | G01C 21/3647 701/400 |

\* cited by examiner

APPARATUS FOR RECOGNIZING LANE PARTITION LINES

CROSS-REFERENCE TO RELATED APPLICATION

This application is based on and claims the benefit of priority from earlier Japanese Patent Applications No. 2014-213325 filed Oct. 20, 2014, the descriptions of which are incorporated herein by reference.

BACKGROUND

Technical Field

The present invention relates to an apparatus for recognizing lane partition lines on opposite sides of a traveling lane based on an image captured by a vehicle-mounted camera.

Related Art

In recent years, there have been proposed various driving assistance apparatuses for recognizing lane partition lines on opposite sides of a traveling lane on a roadway based on an image captured by a vehicle-mounted camera. Some of the apparatuses are configured to detect lane partition line candidates from the image, and select lane partition lines from the lane partition line candidates using a previously acquired lane width.

For example, a vehicle-mounted image processor disclosed in Japanese Patent Application Laid-Open Publication No. H09-35065 is configured to calculate left and right candidate points as outline candidate points of left and right lane partition lines of the traveling lane from the image, and determine left and right candidate points, a distance between which is closest to a lane width, as being recognition points of the left and right lane partition lines. The lane width used therein is a lane width learned based on the distances between the previously determined recognition points of left and right lane partition lines.

The traveling lane and its adjacent lane may have different lane widths. For example, in the case of a two-way roadway having three lanes for each direction, a more central lane of the three lanes on a left- or right-half side of the roadway may often have a larger lane width. Therefore, limiting the recognition of the lane partition lines based on a learned value of the lane width may prevent the recognition of the lane partition lines during a lane change between the lanes having different lane widths, which may delay re-recognition of the lane partition lines on opposite sides of a traveling lane after the lane change.

In consideration of the foregoing, exemplary embodiments of the present invention are directed to providing an apparatus for recognizing lane partition lines on opposite sides of a traveling lane on a roadway, capable of reducing a delay in recognition of the lane partition lines of a traveling lane after a lane change between lanes having equal or even different lane widths.

SUMMARY

In accordance with an exemplary embodiment of the present invention, there is provided an apparatus for recognizing lane partition lines on opposite sides of a traveling lane of a vehicle based on a forward image captured by a camera mounted in the vehicle. In the apparatus, a lane width learner is configured to calculate a lane width from the lane partition lines detected based on the forward image, and learn the calculated lane width. An allowable range limiter is configured to, based on a learned value of the lane width learned by the lane width learner, limit allowable ranges for the respective lane partition lines, in which allowable ranges the respective lane partition lines are allowed to be detected in the forward image. A lane change determiner is configured to determine whether or not there is a lane change made by the vehicle. The allowable range limiter is further configured to, if it is determined by the lane change determiner that there is a lane change, enlarge at least one of the allowable ranges limited by the allowable range limiter based on the learned value of the lane width.

With this configuration, the lane width is calculated from the lane partition lines on opposite sides of the traveling lane of the vehicle detected based on the forward image captured by the camera mounted in the vehicle, and the calculated lane width is learned. Based on the learned lane width, allowable ranges for the respective lane partition lines are limited, in which allowable ranges the respective lane partition lines are allowed to be detected in the forward image. If it is determined that there is a lane change, at least one of the allowable ranges limited based on the learned lane width is enlarged. Therefore, in the absence of a lane change, the allowable ranges are limited based on the learned value of the lane width, which can reduce a processing load. In the presence of a lane change, at least one of the allowable ranges limited based on the learned value of the lane width is enlarged, which can reduce a delay of recognizing the lane partition lines on opposite sides of the traveling lane after the lane change even in the case that the lane change is made between lanes having different lane widths, thereby improving stability of the white line recognition after the lane change.

DESCRIPTION OF SPECIFIC EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals, and descriptions of them will not be repeated.

Figure 1:
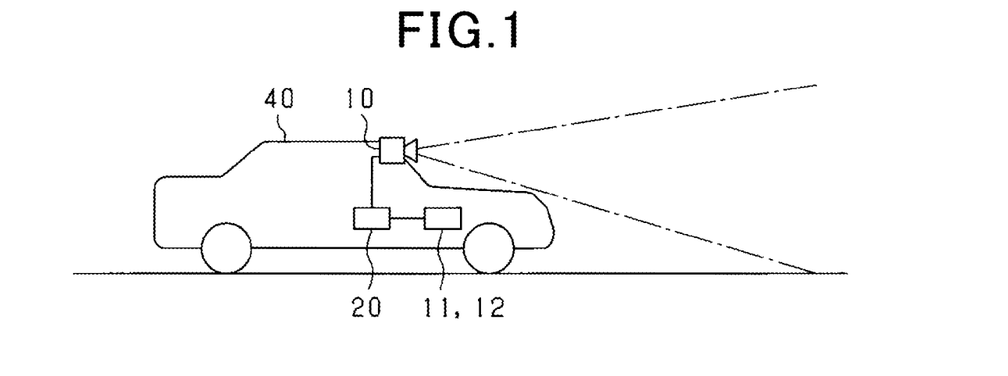
FIG. 1 is an example of a mounting position of a vehicle-mounted camera.
Figure 2:
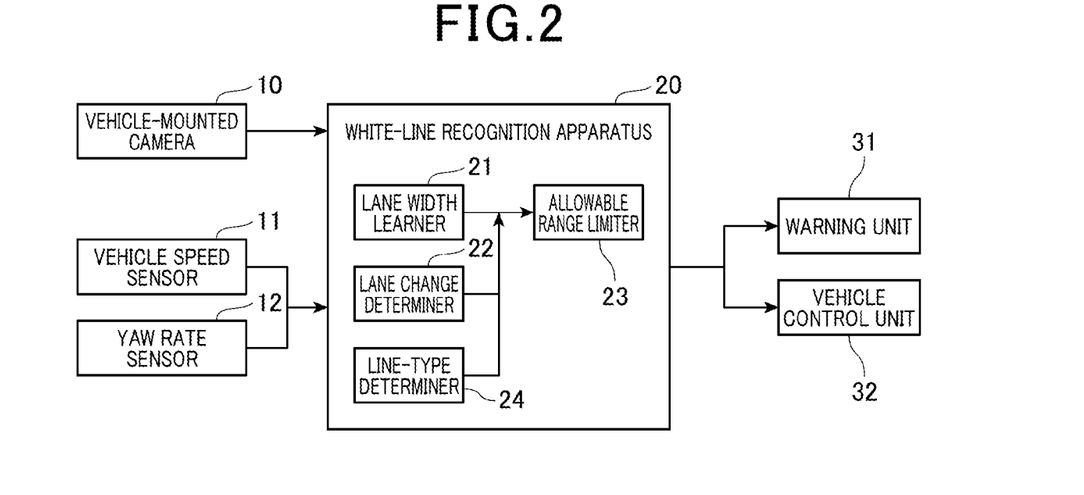
FIG. 2 is a block diagram of a white-line recognition apparatus.

A white-line recognition apparatus (as a lane partition line recognition apparatus) 20 in accordance with one embodiment of the present invention will now be explained with reference to FIGS. 1 and 2. The white-line recognition apparatus 20 of the present embodiment is mounted in a vehicle 40 and configured to recognize white lines (as lane partition lines) that partition a roadway into traffic lanes based on a forward image captured by the vehicle-mounted camera 10.

The vehicle-mounted camera 10 may include at least one of a CCD image sensor, a CMOS image sensor and the like. As shown in FIG. 1, the vehicle-mounted camera 10 may be placed near the top end of a front windshield of the vehicle 40 to capture an image of an area that spans a pre-defined angular range horizontally with respect to a traveling direction. That is, the vehicle-mounted camera 10 captures an image of ambient surroundings including a roadway in front of the vehicle 40.

A vehicle speed sensor 11 is mounted in the vehicle 40 and configured to detect a speed of the vehicle 40. A yaw rate sensor 12 is mounted in the vehicle 40 and configured to detect a yaw rate of the vehicle 40.

A warning unit 31 and a vehicle control unit 32 are configured to assist the driver in driving the vehicle 40 based on white-line recognition results of the white-line recognition apparatus 20. The warning unit 31 is configured to output a lane departure alert when a lateral distance between a recognized white line and the vehicle 40 becomes equal to or less than a first distance or when the vehicle 40 has crossed the recognized white line. The vehicle control unit 32 is configured to control a steering and a brake of the vehicle 40 so that the vehicle 40 keeps traveling in a lane between the recognized adjacent white lines.

The white-line recognition apparatus 20 includes CPU, RAM, ROM, an input/output (I/O) interface, storage and other components. FIG. 2 shows a functional block diagram of the white-line recognition apparatus 20. The white-line recognition apparatus 20 includes a lane width learner 21, a lane change determiner 22, an allowable range limiter 23, and a line-type determiner 24. Functions of these functional blocks may be implemented by the CPU executing various programs stored in the ROM or the like.

The white-line recognition apparatus 20 is configured to extract white-line candidates from the forward image captured by the vehicle-mounted camera 10, and for each of the extracted white-line candidates, calculate a likelihood Lc that is a degree of confidence in white-line likeness. Further, the white-line recognition apparatus 20 is configured to detect, as a white line, the white-line candidate having a maximum likelihood Lc among the white-line candidates having a likelihood higher than a detection threshold, and calculate white line parameters from the detected white line, thereby recognizing a white line. For the white line candidate exhibiting white line features to a higher degree, a higher likelihood Lc can be calculated. The white-line recognition apparatus 20 is configured to, for each of the white line candidates, calculate a likelihood for each of the white line features that is indicative of a degree to which the white-line candidate exhibits the white line feature, and calculate an integration of the degrees for the respective white line features, thereby providing the likelihood Lc for the white-line candidate.

In the white-line recognition apparatus 20, a likelihood La for the consistency of the lane width is calculated. The consistency of the lane width is one of the white line features. How to calculate the likelihood La will now be explained. The lane width learner 21 is configured to calculate a lane width between the white lines on opposite sides of the traveling lane detected based on the forward image, and learn the calculated lane width. More specifically, the lane width learner 21 is configured to update a learned value of the lane width using previous learned values and the currently calculated lane width, and store the updated learned value in the storage. The allowable range limiter 23 is configured to, based on the (updated) learned value of the lane width learned by the lane width learner 21, limit allowable ranges, where within each of the allowable ranges a white line is allowed to be detected in the forward image.

Figure 3:
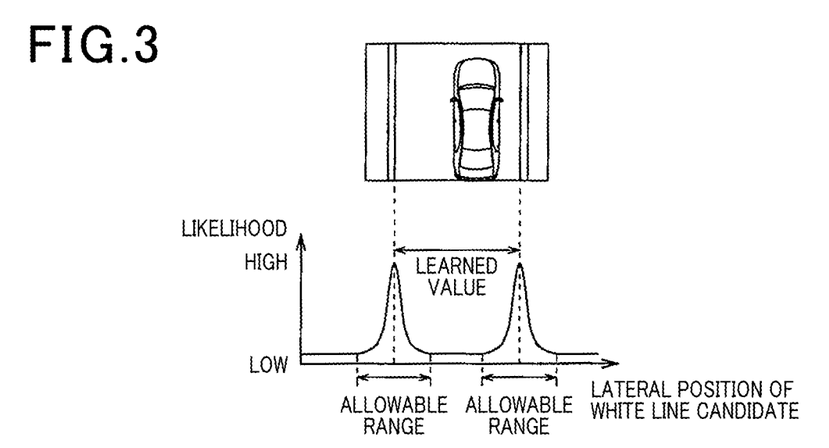
FIG. 3 is an example of likelihood La in a scenario where both white lines on opposite sides of a traveling lane are detected.

FIG. 3 shows the likelihood La as a function of a lateral position of the white line candidate in the case that the white lines on opposite sides of the traveling lane are detected. The allowable range limiter 23 is configured to, based on the learned value of the lane width, limit the allowable ranges in the horizontal direction of the image such that the lane width of the learned value plus or minus a little margin is allowed as shown in FIG. 3. The allowable range limiter 23 is configured to calculate the likelihood La on the allowable ranges such that the likelihood La takes a higher value as a spacing between the white-line candidates on opposite sides of the traveling lane approaches the learned value of the lane width. In addition, the allowable range limiter 23 is configured to calculate the likelihood La on outside the allowable ranges such that the integrated likelihood Lc takes a very low value equal to or lower than the detection threshold. The allowable range limiter 23 may calculate the likelihood La taking binary values (Low and High values) or may calculate the likelihood La taking stepped values.

The lane widths of the traveling lane and its adjacent lane may be different. For example, in the case of a two-way roadway having three or more lanes for each direction, a lane width of a more central lane of the three or more lanes on a left- or right-half side of the roadway may be often greater than a lane width of the left-most or right most lane. Therefore, when the traveling lane is changed to another lane having a different lane width, use of the allowable ranges limited based on the lane width learned value may lead to a detection failure such that one of the white lines on opposite sides of the other lane (the traveling lane after the lane change) farther away from the traveling lane before the lane change fails to be detected. The allowable range limited to support any lane width, however, may lead to an unduly broadened allowable range, which may increase a processing load.

Figure 4:
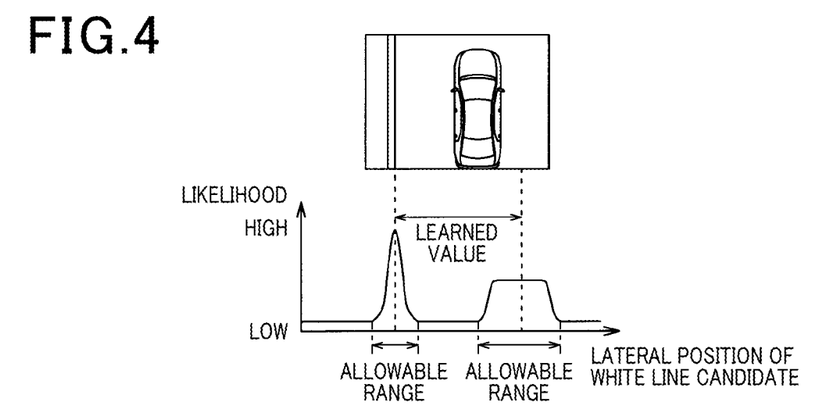
FIG. 4 is an example of likelihood La in a scenario where only one of white lines on opposite sides of a traveling lane is detected.

Therefore, in the case that only one of the white lines on opposite sides of the traveling lane is detected as shown in FIG. 4, the allowable range limiter 23 is configured to, whether or not the lane change is made, enlarge the allowable range on the undetected white line side such that the likelihood La takes a neutral or median value on the allowable range on the undetected white line side. More specifically, the allowable range limiter 23 is configured to enlarge the allowable range on the undetected white line side in first and second lateral directions such that enlargement of the allowable range in the first direction allows the lane to have a lane width greater than the learned value and enlargement of the allowable range in the second direction allows the lane to have a lane width less than the learned value. The allowable range limiter 23 is further configured to calculate a maximum likelihood La on the enlarged allowable range such that the maximum likelihood takes the neutral or median value that is lower than a maximum likelihood La on the allowable range before the enlargement.

Figure 5:
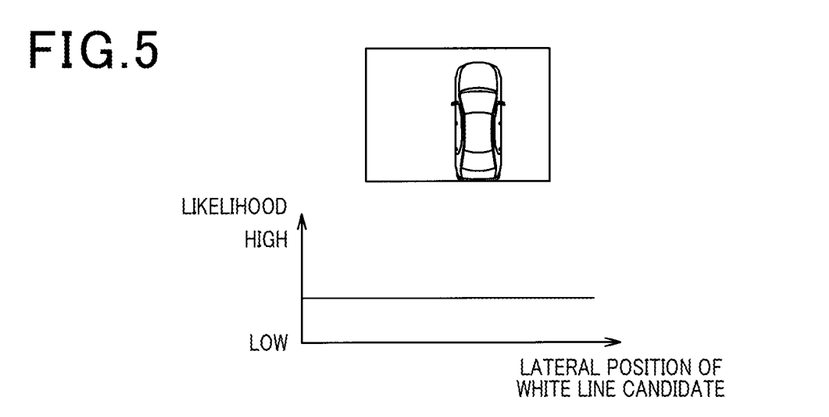
FIG. 5 is an example of likelihood La in a scenario where no white lines on opposite sides of a traveling lane are detected.

In addition, in the case that no white lines on opposite sides of the traveling lane are detected as shown in FIG. 5, the allowable range limiter 23 is configured to leave the allowable ranges on both sides of the traveling lane unlimited. In such a case, the allowable range limiter 23 is configured to calculate the likelihood La such that the likelihood La takes a neutral or median value at any lateral position of the white line candidate.

The allowable range limiter 23 is further configured to enlarge at least one of the allowable ranges in response to a lane change. More specifically, the allowable range limiter 23 is configured to, when it is determined by the lane change determiner 22 (described later) that there is a lane change, enlarge only the allowable range limited based on the learned value for a farther one of the white lines on opposite sides of the traveling lane after the lane change from the traveling lane before the lane change. The white line between the traveling lane after the lane change and the traveling lane before the lane change has been detected since before the lane change. Therefore, a closer one of the white lines on opposite sides of the traveling lane after the lane change to the traveling lane before the lane change does not have to be enlarged.

The allowable range limiter 23 is further configured to, if a white line is not detected within a predetermined period of time after enlarging the allowable range when it is determined by the lane change determiner 22 (described later) that there is a lane change, further enlarge the allowable range. More specifically, the allowable range limiter 23 may enlarge the allowable range in a gradual or stepwise manner.

In cases where it can be determined that the lane width of the traveling lane after the lane change is greater than the lane width of the traveling lane before the lane change, the allowable range limiter 23 does not have to enlarge the allowable range limited based on the learned value of the lane width in both the first and second directions when it is determined that there is a lane change. If the traveling lane is changed to a lane having a lane width greater than before the lane change, for example, if the traveling lane is changed from the left-most or right-most lane to a more central lane, the allowable range limiter 23 may be configured to enlarge the allowable range only in the first direction such that the enlargement of the allowable range in the first direction allows a lane to have a lane width greater than the learned value. If the traveling lane is changed to a lane having a lane width less than before the lane change, for example, if the traveling lane is changed from a more central lane to the left-most or right-most lane, the allowable range limiter 23 may be configured to enlarge the allowable range only in the second direction such that the enlargement of the allowable range in the second direction allows a lane to have a lane width less than the learned value.

Figure 6:
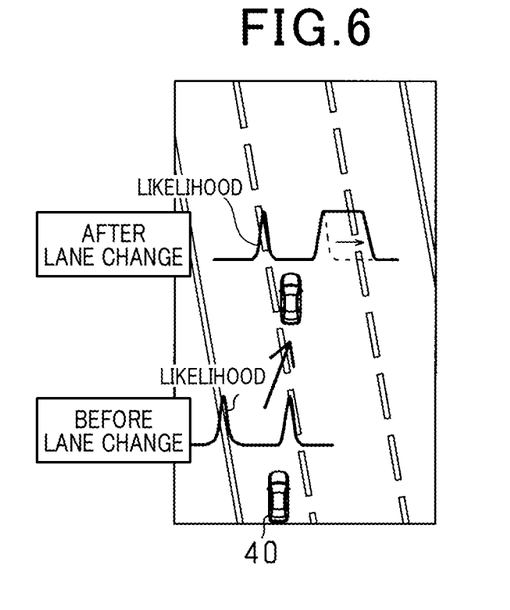
FIG. 6 is an example of likelihood La in a scenario where a lane change is made from a lane having one white broken line and one white non-broken line.

In the case of a two-way roadway having two or more lanes for each direction, each of the left-most and right-most lanes on a left- or right-half side of the roadway has at least one white non-broken (e.g., solid) line. Also, in the case of a two-way roadway having one lane for each direction, a single lane on a left- or right-half side of the roadway has at least one white non-broken (e.g., solid) line. As shown in FIG. 6, the allowable range limiter 23 is configured to, if it is determined by the line-type determiner 24 that the traveling lane before the lane change has at least one white non-broken (e.g., solid) line and if it is determined by the lane change determiner 22 that there is a lane change, enlarge the allowable range only in the first direction such that the enlargement of the allowable range in the first direction allows a lane to have a lane width greater than the learned value.

In general, in the case that both the white lines on opposite sides of the traveling lane are non-broken lines, the traveling lane is one of the lanes of the two-way roadway having one lane for each direction. In such a case, a lane change will not occur. Therefore, the allowable range limiter 23 may be configured to, if it is determined by the line-type determiner 24 that the traveling lane before the lane change has one white broken line and one white non-broken line, enlarge the allowable range only in the first direction such that the enlargement of the allowable range in the first direction allows a lane to have a lane width greater than the learned value. In FIG. 6, the likelihood La indicated by the broken line on the right side of the traveling lane after the lane change is the likelihood La before the enlargement, and the likelihood La indicated by the solid line on the right side of the traveling lane after the lane change is the likelihood La after the enlargement. Similarly, in FIG. 7, the likelihood La indicated by the broken line on the right side of the traveling lane after the lane change is the likelihood La before the enlargement, and the likelihood La indicated by the solid line on the right side of the traveling lane after the lane change is the likelihood La after the enlargement.

The allowable range limiter 23 may be further configured to, if a white line is not detected within a predetermined period of time after enlarging the allowable range, further enlarge the allowable range only in the first direction or in both the first and second directions. As described above, the enlargement of the allowable range in the first direction allows a lane to have a lane width greater than the learned value. The enlargement of the allowable range in the second direction allows a lane to have a lane width less than the learned value.

In the case of a two-way roadway having two lanes for each direction, the traveling lane will be changed between the two lanes on a left- or right-half side of the roadway having a substantially equal lane width. In such a case, the white lines on opposite sides of the traveling lane after the lane change may be detected without enlarging the allowable range. Of course, the allowable range may be enlarged to detect the white lines of the traveling lane after the lane change.

Figure 7:
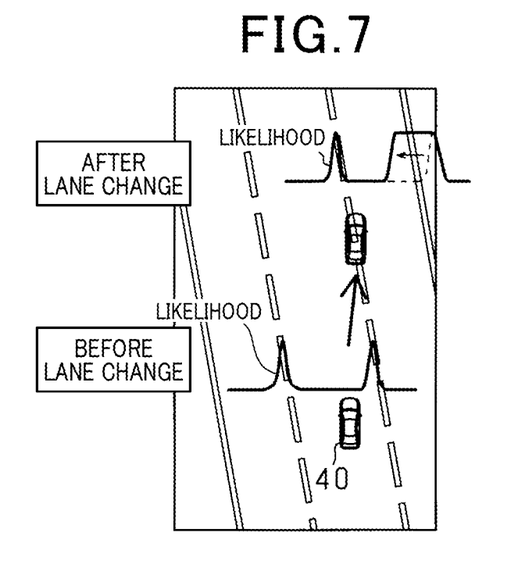
FIG. 7 is an example of likelihood La in a scenario where a lane change is made from a lane having white broken lines on its opposite sides.

In the case of a two-way roadway having three or more lanes for each direction, a more central lane on a left- or right-half side of the roadway has broken lines on its opposite sides. Therefore, the allowable range limiter 23 is configured to, if it is determined by the line-type determiner 24 that both the white lines on opposite sides of the traveling lane before the lane change are broken lines and if it is determined by the lane change determiner 22 that there is a lane change, enlarge the allowable range only in the second direction such that the enlargement of the allowable range in the second direction allows a lane to have a lane width less than the learned value, as shown in FIG. 7. The allowable range limiter 23 may be configured to, if a white line is not detected within a predetermined period of time after enlarging the allowable range, further enlarge the allowable range only in the second direction or in both the first and second directions. As described above, the enlargement of the allowable range in the first direction allows a lane to have a lane width greater than the learned value. The enlargement of the allowable range in the second direction allows a lane to have a lane width less than the learned value.

In the case of a two-way roadway having four or more lanes for each direction, the traveling lane will be changed between more central lanes on a left- or right-half side of the roadway having a substantially equal lane width. In such a case, the white lines on opposite sides of the traveling lane after the lane change may be detected without enlarging the allowable range. Of course, the allowable range may be enlarged to detect the white lines on opposite sides of the traveling lane after the lane change.

The lane change determiner 22 is configured to detect the presence or absence of a lane change made by the vehicle 40. More specifically, the lane change determiner 22 is configured to, if the vehicle 40 is going to change the lane or the vehicle 40 is now changing the lane, determine that there is a lane change. The line-type determiner 24 is configured to determine whether or not the detected white line is a broken line.

Figure 8:
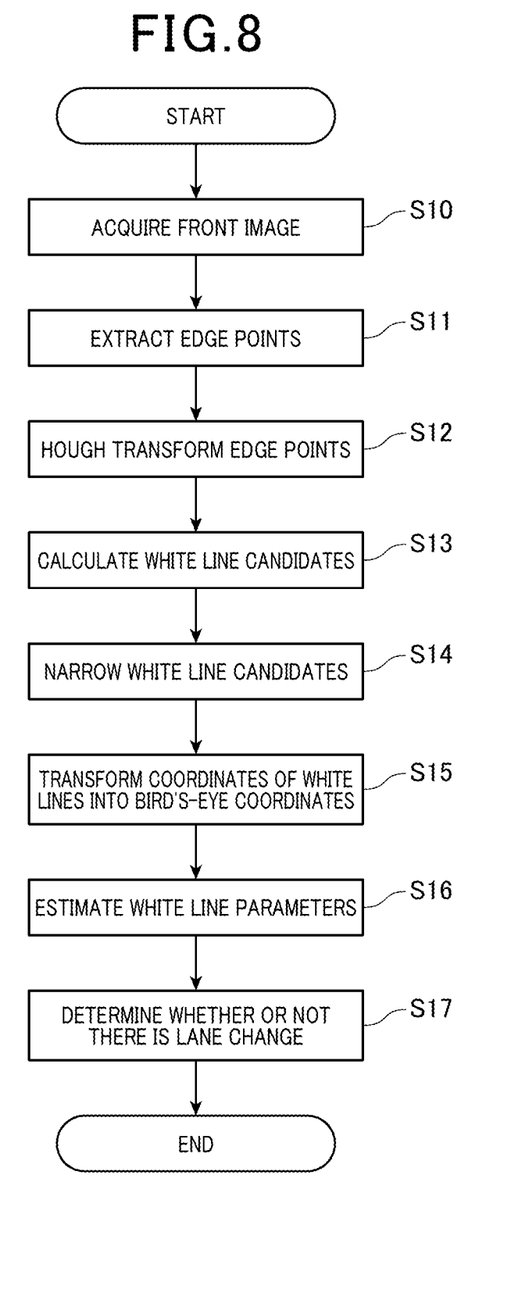
FIG. 8 is a flowchart of a white line recognition process.

A process for recognizing white lines (hereinafter also referred to as a white line recognition process) will now be explained with reference to a flowchart of FIG. 8. This process may be performed in the white-line recognition apparatus 20 each time the vehicle-mounted camera 10 captures the forward image.

First, in step S10, a forward image captured by the vehicle-mounted camera 10 is acquired. Subsequently in step S11, edge points are extracted from the forward image by applying a sobel filter or the like to the forward image. In step S12, the edge points extracted in step S11 are Hough transformed. In step S13, white-line candidates that are straight lines having a number of Hough transform votes greater than a predetermined number are calculated.

Subsequently, in step S14, the white-line candidates calculated in step S13 are narrowed or refined to detect one of the white-line candidates having a maximum likelihood as a white line. More specifically, a likelihood is calculated for each of the plurality of white line features including the consistency of the vehicle width, and the calculated likelihoods for the respective features are integrated to calculate a likelihood (referred to as an integrated likelihood) Lc. One of the white-line candidates having a maximum likelihood Lc is selected from the of the white-line candidates as a white line. The features other than the consistency of the vehicle width may include a feature that the edge intensity is higher than a predetermined edge intensity.

The likelihood La for the consistency of the lane width is calculated such that the likelihood La becomes higher on the allowable ranges as a spacing between the left and right white-line candidates of the traveling lane approaches the learned value of the lane width. Based on the predicted positions of the white lines and the learned values of the lane width, the allowable ranges are set such that the lane width of the learned value plus or minus a little margin is allowed to be detected. The predicted positions of the white lines are calculated from previous recognition results of the white line, a detected vehicle speed, and a detected yaw rate.

If, in the previous cycle, it is determined that there is a lane change and it is determined that only one of the white lines on opposite sides of the traveling lane before the lane change is a broken line, the allowable range limited based on the learned value of the lane width is enlarged in the first direction, the enlargement of the allowable range in which direction allows a lane to have a lane width greater than the learned value. If, in the previous cycle, it is determined that there is a lane change and it is determined that both the white lines on opposite sides of the traveling lane before the lane change are broken lines, the allowable range limited based on the learned value of the lane width is enlarged in the second direction, the enlargement of the allowable range in which direction allows a lane to have a lane width less than the learned value.

If in the previous cycles the allowable range limited based on the learned value of the lane width has been already enlarged and both the white lines on opposite sides of the traveling lane after the lane change have been successfully detected, learning of the vehicle width after the lane change has been initiated. Therefore, the allowable range limited based on the learned value of the lane width is no further enlarged.

If, despite that the allowable range is enlarged in the current cycle, not both white lines on opposite sides of the traveling lane after the lane change are detected, the allowable range is further enlarged in each of the subsequent cycles until both the white lines on opposite sides of the traveling lane after the lane change are successfully detected.

Subsequently, in step S15, coordinates of the white lines detected in step S14 are transformed into the bird's-eye coordinates. In step S16, white line parameters are estimated from the white lines in the bird's-eye coordinate system. The white line parameters include a lane curvature, a lateral position of the vehicle 40 in the lane, a tilt angle of the traveling lane to the vehicle 40, a lane width and others. The estimated lane width is learned. Further, for each of the detected white lines, it is determined whether or not the detected white line is a broken line. For example, for each of the detected white lines, if the number of edge points included in the detected white line of a predetermined length is equal to or less than a predetermined number, then it is determined that the white line is a broken line.

Subsequently, in step S17, it is determined whether or not there is a lane change. More specifically, if the vehicle 40 is going to change the lane or if the vehicle 40 is now changing the lane, it is determined that there is a lane change. For example, if an angle between the vehicle 40 and the recognized white line exceeds a predetermined angle, it is determined that the vehicle 40 is going to change the lane or the vehicle 40 is now changing the lane, thereby determining that there is a lane change. If it is determined that there is a lane change, it is determined whether the traveling lane is changed to the left or right adjacent lane. The angle between the vehicle 40 and the recognized white line can be calculated from the tilt angle of the traveling lane to the vehicle 40 as a white line parameter. Thereafter, the process ends.

The present embodiment described above can provide the following advantages.

(1a) A lane width is calculated from white lines detected based on the forward image captured by the vehicle-mounted camera 10, and the calculated lane width is learned. Further, based on the learned value of the lane width, the allowable ranges where the white lines are allowed to be detected in the forward image are limited. Further, if it is determined that there is a lane change, at least one of the allowable ranges limited based on the learned value of the lane width is enlarged.

(1b) Thus, in the absence of a lane change, the allowable ranges are limited based on the learned value of the lane width, which can reduce a processing load. In the presence of a lane change, at least one of the allowable ranges limited based on the learned value of the lane width is enlarged, which can reduce a delay of the white line recognition even in the case that there is a lane change between lanes having different lane widths, thereby improving stability of the white line recognition after the lane change.

(1c) Only one of the allowable ranges limited based on the learned value for a farther one of the white lines on opposite sides of the traveling lane after the lane change from the traveling lane before the lane change is enlarged, which can reduce the delay of the white line recognition while more reducing the processing load as compared to the case that both the allowable ranges for the white lines on opposite sides of the traveling lane after the lane are enlarged.

(1d) If a white line is not detected within a predetermined period of time after enlarging the allowable range when it is determined that there is a lane change, the allowable range is further enlarged. This allows white lines of the traveling lane after the lane change to be detected, regardless of an amount of change in lane width between the traveling lanes before and after the lane change.

(1e) If it is determined that only one of the white lines on opposite sides of the traveling lane before the lane change is a broken line, the traveling lane before the lane change is the left-most or right-most lane on a left- or right-half side of a two-way roadway having two or more lanes for each direction. Therefore, if it is determined that only one of the white lines on opposite sides of the traveling lane before the lane change is a broken line, the traveling lane may be changed from the left-most or right-most lane to a more central lane having a lane width greater than that of the left-most or right-most lane (a first case), or may be changed from the left-most or right-most lane to the right-most or left-most lane where the left-most and right-most lanes have a substantially equal lane width (a second case). Thus, if it is determined that only one of the white lines on opposite sides of the traveling lane before the lane change is a broken line, the allowable range limited based on the learned value of the lane width is enlarged in the first direction, the enlargement of the allowable range in which direction allows a lane to have a lane width greater than the learned values. This can reduce a delay of recognizing the white lines on opposite sides of the traveling lane after the lane change in both the first and second cases.

(1f) If it is determined that both the white lines on opposite sides of the traveling lane before the lane change are broken lines, the traveling lane before the lane change is a more central lane (other than the left-most or right-most lane) on a left- or right-half side of a two-way roadway having three or more lanes for each direction. Therefore, if it is determined that both the white lines on opposite sides of the traveling lane before the lane change are broken lines, the traveling lane may be changed from the more central lane to a left or right side lane having a lane width less than that of the more central lane (a third case) or may be changed from the more central lane to another more central lane having a substantial equal lane width (a fourth case). Thus, if it is determined that both the white lines on opposite sides of the traveling lane before the lane change are broken lines, the allowable range limited based on the learned value of the lane width is enlarged in the second direction, the enlargement of the allowable range in which direction allows a lane to have a lane width less than the learned values. This can prevent a delay of recognizing the white lines of the traveling lane after the lane change in both the third and fourth cases.

(1g) If an angle between the vehicle 40 and the recognized white line exceeds a predetermined angle, the vehicle 40 is going to cross the recognized white line. Therefore, it may be determined that the vehicle 40 is going to change the lane or the vehicle 40 is now changing the lane.

Other Embodiments (i) In one alternative embodiment, if it is determined that there is a lane change, the allowable range may be enlarged not only in the first direction, the enlargement of the allowable range in which direction allows a lane to have a lane width greater than the learned value, but also in the second direction, the enlargement of the allowable range in which direction allows a lane to have a lane width less than the learned value. This can also reduce a delay of recognizing the white lines on opposite sides of the traveling lane after the lane change, and improve stability of the white line recognition after the lane change.

(ii) In one alternative embodiment, if a distance between the vehicle 40 and the recognized white line decreases below a predetermined distance, it may be determined that there is a lane change. The distance between the vehicle 40 and the recognized white line can be calculated from the lateral displacement of the vehicle 40 in the traveling lane as a white line parameter.

(iii) In one alternative embodiment, if a lateral speed of the vehicle 40 exceeds a predetermined lateral speed, it may be determined that there is a lane change. The lateral speed of the vehicle 40 is a speed of the vehicle 40 in a horizontal direction of the traveling lane. The lateral speed of the vehicle 40 can be calculated from a time variation of the lateral displacement of the vehicle 40.

(iv) In one alternative embodiment, if a direction indicator of the vehicle 40 is activated during highway travel, it may be determined that there is a lane change. Typically, it is only when the vehicle 40 is going to change the lane that the driver activates the direction indicator during highway travel. Therefore, if the direction indicator is activated during highway travel, it may be determined that the vehicle 40 is going to change the lane or the vehicle 40 is now changing the lane.

(v) In one alternative embodiment, if the vehicle 40 crosses the white line, it may be determined that the vehicle 40 is now changing the lane, thereby determining that there is a lane change.

What is claimed is:

1. An apparatus for recognizing lane partition lines on opposite sides of a traveling lane of a vehicle based on a forward image captured by a camera mounted in the vehicle, the apparatus comprising:
    a lane width learner configured to calculate a lane width from the lane partition lines detected based on the forward image, and learn the calculated lane width;
    an allowable range limiter configured to, based on a learned value of the lane width learned by the lane width learner, limit allowable ranges within the forward image for detecting the respective lane partition lines, in which the respective lane partition lines are allowed to be detected in the forward image; and
    a lane change determiner configured to determine whether or not there is a lane change made by the vehicle,
    wherein the allowable range limiter is further configured to, if it is determined by the lane change determiner that there is a lane change, enlarge at least one of the allowable ranges within the forward image for detecting the respective lane partition lines that is limited by the allowable range limiter based on the learned value of the lane width.

2. The apparatus of claim 1, wherein the allowable range limiter is configured to, if it is determined by the lane change determiner that there is a lane change, enlarge only the allowable range for a farther one of the lane partition lines on opposite sides of the traveling lane after the lane change from the traveling lane before the lane change.

3. The apparatus of claim 1, wherein the allowable range limiter is configured to, if a lane partition line is detected within a predetermined period of time after enlarging the at least one of the allowable ranges when it is determined that there is a lane change, further enlarge the at least one of the allowable ranges.

4. The apparatus of claim 1, further comprising a line-type determiner configured to, for each of the lane partition lines detected based on the forward image, determine whether or not the lane partition line is a broken line,
   wherein the allowable range limiter is configured to, if it is determined by the line-type determiner that at least one of the lane partition lines on opposite sides of the traveling lane before the lane change is a non-broken line and if it is determined by the lane change determiner that there is a lane change, enlarge the allowable range only in a first direction, the enlargement of the allowable range in the first direction allowing a lane to have a lane width greater than the learned value of the lane width.

5. The apparatus of claim 4, wherein the allowable range limiter is configured to, if it is determined by the line-type determiner that only one of the lane partition lines on opposite sides of the traveling lane before the lane change is a broken line, enlarge the allowable range only in the first direction, the enlargement of the allowable range in the first direction allowing a lane to have a lane width greater than the learned value of the lane width.

6. The apparatus of claim 1, further comprising a line-type determiner configured to, for each of the lane partition lines detected based on the forward image, determine whether or not the lane partition line is a broken line,
   wherein the allowable range limiter is configured to, if it is determined by the line-type determiner that both the partition lines on opposite sides of a traveling lane before the lane change are broken lines and if it is determined by the lane change determiner that there is a lane change, enlarge the allowable range only in a second direction, the enlargement of the allowable range in the second direction allowing a lane to have a lane width less than the learned value.

7. The apparatus of claim 1, wherein the lane change determiner is configured to, when the vehicle crosses one of the lane partition lines on opposite sides of the traveling lane, determine that there is a lane change.

8. The apparatus of claim 1, wherein the lane change determiner is configured to, when an angle between the vehicle and one of the lane partition lines on opposite sides of the traveling lane exceeds a predetermined angle, determine that there is a lane change.

9. The apparatus of claim 1, wherein the lane change determiner is configured to, when a distance between the vehicle and one of the lane partition lines on opposite sides of the traveling lane decreases below a predetermined distance, determine that there is a lane change.

10. The apparatus of claim 1, wherein the lane change determiner is configured to, when a lateral speed of the vehicle that is a speed of the vehicle in a horizontal direction of the traveling lane exceeds a predetermined lateral speed, determine that there is a lane change.

11. The apparatus of claim 1, wherein the lane change determiner is configured to, when a direction indicator of the vehicle is activated, determine that there is a lane change.

12. The apparatus of claim 1, wherein the lane change determiner is configured to determine whether or not the lane change is going to be made.

13. The apparatus of claim 1, wherein the lane change determiner is configured to determine whether or not the lane change is now being made.

14. A method for recognizing lane partition lines based on a forward image captured by a camera mounted in the vehicle, comprising steps of:
   calculating a lane width from the lane partition lines detected based on the forward image;
   learning the calculated lane widths;
   determining an allowable range within the forward image for detecting the respective lane partition lines based on the learned calculated lane widths;
   limiting candidates of the respective lane partition lines based on the allowable range; and
   determining a lane change made by the vehicle, wherein the limiting step comprises enlarging the allowable range within the forward image for detecting the respective lane partition lines if it is determined that the vehicle is making a lane change.

* * * * *